Figure 1:
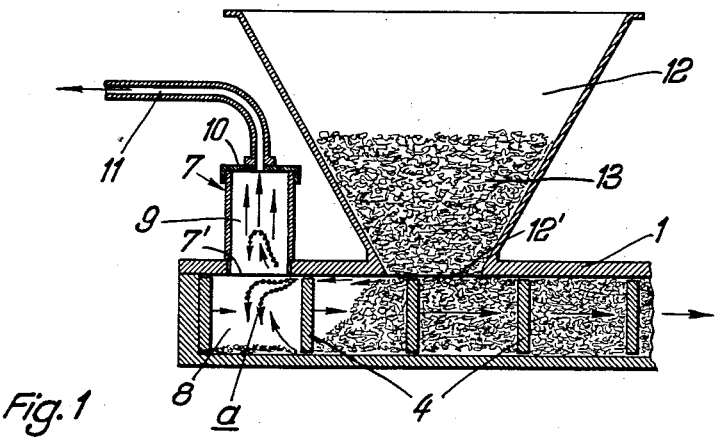

Dec. 13, 1960   P. GAUDLITZ   2,963,735
MACHINES FOR INTRODUCING FOODSTUFFS INTO CONTAINERS
Filed Oct. 22, 1957   2 Sheets-Sheet 1

Dec. 13, 1960          P. GAUDLITZ          2,963,735
MACHINES FOR INTRODUCING FOODSTUFFS INTO CONTAINERS
Filed Oct. 22, 1957          2 Sheets-Sheet 2
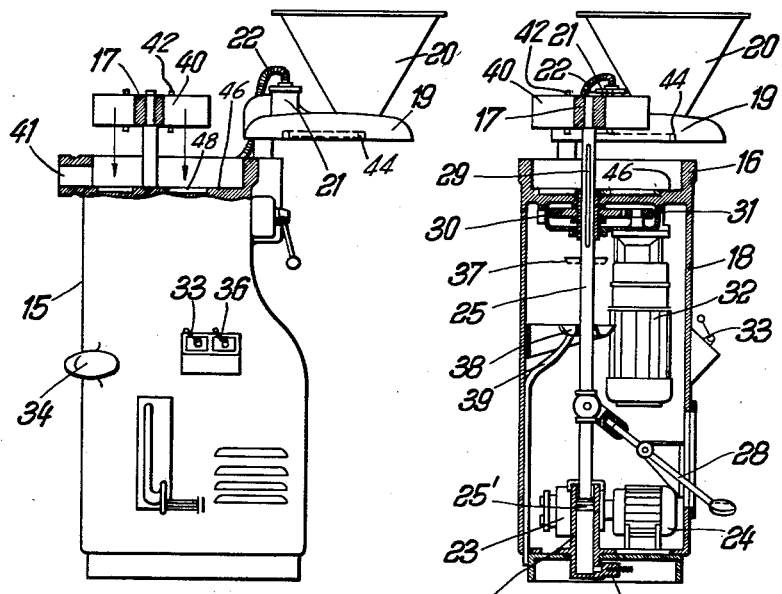
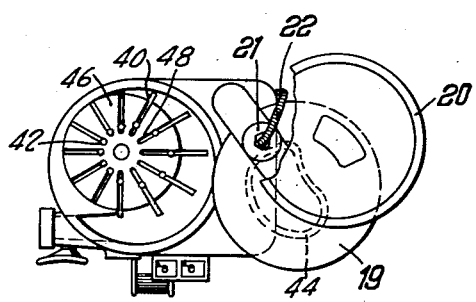

United States Patent Office 2,963,735
Patented Dec. 13, 1960

2,963,735

MACHINES FOR INTRODUCING FOODSTUFFS INTO CONTAINERS

Paul Gaudlitz, Hamburg-Schnelsen, Germany, assignor to Heinz Becker, Hamburg-Blankenese, Germany Filed Oct. 22, 1957, Ser. No. 691,562

Claims priority, application Germany Oct. 25, 1956

3 Claims. (Cl. 17—37)

This invention relates to a machine for introducing foodstuffs into containers and is particularly applicable to a machine for introducing foodstuffs into casings.

A machine for introducing meat filling into sausage casings consisting of gut or the like has already been proposed. It comprises a housing, an inlet to the housing for food material to enter, an outlet spaced from the inlet for the material to leave the housing, a rotor mounted within the housing and eccentric with respect thereto, a plurality of substantially radial vanes in the rotor and means for causing the vanes to reciprocate cyclically as the rotor turns, thereby ensuring that the vanes move outwardly as they approach the inlet and therefore project beyond the rotor in the inlet neighbourhood and deliver the material to the outlet. In this machine it has further been proposed to provide a device for the extraction of air in order to prevent the formation of empty cavities between the food material and the vanes. With this arrangement, the planes of the rotor are vertical, i.e. the rotor axis extends horizontally. With such a machine, the disadvantage exists that when air is extracted by suction the filter, which must be disposed at the mouth of the suction pipe, becomes clogged within a short time, so that the suction fails. Therefore, a continuous cleaning of the filter is necessary.

It is an object of the present invention to provide a machine of the general kind indicated above but in which the danger of obstruction of the filter and the suction pipe is avoided.

According to the invention there is, in a machine for introducing foodstuffs into containers, comprising a housing, an inlet to the housing for food material to enter, an outlet spaced from the inlet for the material to leave the housing, a rotor mounted within the housing and eccentric with respect thereto, a plurality of substantially radial vanes in the rotor, means for causing the vanes to reciprocate cyclically as the rotor turns, thereby ensuring that the vanes move outwardly as they approach the inlet and therefore project beyond the rotor in the inlet neighborhood and deliver the material to the outlet, the provision of a suction chamber above the housing and open to the interior of the housing in the region where the vanes move outwardly before reaching the inlet, a suction pipe connected at one end to the suction chamber and an evacuating device connected to the other end of the pipe for withdrawing air from said region.

The suction chamber may with advantage comprise a cylindrical transparent body provided with a removable cover into which the suction pipe leading to the evacuating device opens.

In a preferred constructional form, the cross-section of the suction chamber is made so large in relation to the cross-section of the suction pipe that the suction force exerted on any of the food material situated in the aforementioned region is smaller than the gravitational force acting thereon.

The planes of the rotor are preferably horizontal, that is to say the rotor shaft extends vertically.

In the filling machine to be described, it is very unlikely that food material will enter the suction pipe. Consequently, no filter need be provided. However, for the sake of precaution a replaceable hair-filter may be provided at the mouth of the suction pipe.

The point a which the suction chamber opens into the housing is preferably at a distance in front of the mouth of the supply hopper, as seen in the direction of rotation, which is equal to the distance between two vanes of the rotor. The result is thus obtained that there is no direct connection between the filling material entering through the hopper and the evacuating device, because at least one vane always lies between the mouth of the hopper and the opening of the suction chamber. Any filling material which reaches the lower part of the suction chamber falls back onto the rotor under the action of gravity and is carried forward by the free vanes.

Figure 2:
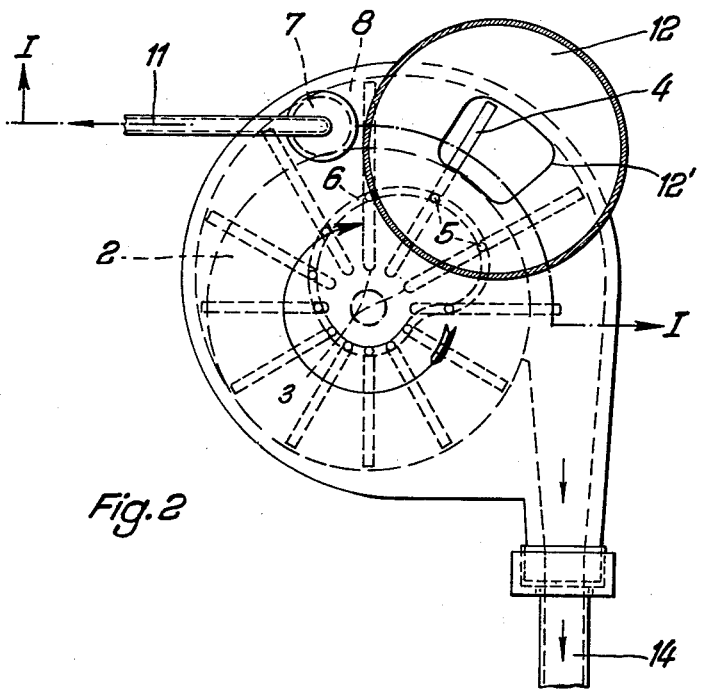

For a better understanding of the invention and to show how the same may be carried into effect, reference will now be made to the accompanying drawings in which:

Figure 1 is a section through part of a sausage-filling machine, the section corresponding to that seen along the line I—I in Figure 2, Figure 2 is a diagrammatic plan view of the filling machine according to Figure 1, Figure 3 is a side elevation, partly in section, of another constructional form of a sausage-filling machine, Figure 4 is a vertical section of the machine shown in Figure 3, and, Figure 5 is a plan view of the same machine.

In the constructional form illustrated in Figures 1 and 2, 1 designates a machine housing in which a rotor 2 is rotatably mounted in a position eccentric with respect to the housing. The intended direction of rotation of the rotor is indicated by the arrow in Figure 2. Blades or vanes 4 are disposed in substantially radial slits or recesses 3 in the rotor 2 and are caused to reciprocate cyclically therein as the rotor turns. For this purpose the vanes are provided with pins 5 which engage in guide slots 6 provided in the top and bottom of the housing 1. At one point in the rotation of the rotor, at the bottom in Figure 2, the vanes are withdrawn into the rotor but they move outwardly as they rotate towards the food inlet, which here consists of the mouth 12' of a hopper 12. The vanes 4 are outermost of the food material inlet, and so a substantial quantity of the material, denoted by 13, is inserted between each two adjacent vanes. When the vanes pass the inlet they slide back into the rotor and the housing wall approaches nearer to the rotor axis so that it is impossible for the food to be carried round with the rotor and it is forced out through an outlet 14. It will be appreciated that when the vanes move outwardly as they approach the inlet opening, a pocket of air will be formed between each two adjacent vanes. It is important to prevent as much as possible of this air from passing into the food material entering the machine via the hopper 12 since it can lead to the formation of air pockets in the sausages themselves.

Situated on the top of the housing 1 is a dome-like suction chamber 7, which is disposed above, and is open to the housing region, denoted by 8, where the vanes move outwardly before reaching the inlet. The suction chamber 7 comprises a cylindrical body 9, which is preferably constructed of transparent material such as glass or plastic, and has a removable lid 10 into which there opens a suction pipe 11 leading to an evacuating device (not shown). As will be seen from the drawing, the distance between the mouth 7' of the suction chamber and the mouth 12' of the hopper is somewhat greater than the distance between the tips of two adjacent vanes.

The withdrawal of air by the evacuating device ensures that no substantial quantities of air can be included in the filling material within the housing or after the discharge from the filling branch 14 into a container, for example into a sausage casing.

The air is sucked out of the filling material through the fine gaps present between the vanes 4 and the wall of the rotor housing 1, and enters the suction chamber 7, from which it flows through the suction pipe 11 to the evacuating device. Any filling material which may pass through the fine gaps between the vanes and the rotor housing into the region 8 cannot reach the suction pipe 11, because it falls back into the housing 8 from the lower part of the body 9 of the suction chamber under the action of gravity. It is immediately taken up by the free blades 4, so that the region 8 remains substantially permanently free. The path of any filling material which may have trickled through is indicated by the arrows $a$ in Figure 1.

In the constructional form according to Figures 3, 4 and 5, a filling machine has an upright housing 15 which has an upper portion 16 to receive the rotor 17 and a lower portion 18 to receive the driving devices. The upper housing portion 16 is closed during operation by a lid 19 which is adapted to be lifted and swung out to the position indicated in Figure 3. The lid 19 supports the hopper 20, which may be integral with the lid, and it also supports the suction chamber 21, which is connected by a suction pipe 22 to a suction pump 23 driven by a motor 24.

Mounted within the upright housing 15 is a vertical shaft 25 which is adapted to be raised and lowered. The raised position is indicated in Figures 3 and 4. The shaft has a lower piston-like end 25' which slides in a guide 26 designed as a brake cylinder and comprising a spring-loaded valve 27. The shaft 25 can be raised and lowered by means of a pivoted pedal 28. The upper part of the shaft 25 is slidably connected to a drive. For this purpose, there is mounted on the shaft 25 a projection 29, which is adapted to slide in a corresponding slot in a driving gear wheel 30. The gear wheel 30 is driven through a pinion 31 by a motor 32. The motor may be provided with an infinitely variable gearing. A main switch 33 is provided for the motor. In addition, a knee-operated switch 34 is provided on the housing for the individual control of the ejection of the filling material. The suction pump 23 and its driving motor 24 are mounted on the base of the lower housing part 18. The suction pump is started by means of a switch 36.

Mounted on the shaft 25 are one or more overflow discs 37, which, when the machine is being cleaned, take up any cleaning liquid running down the shaft 25 and deliver it into a fixedly mounted discharge trough 38, from which it flows down through a discharge pipe 39 to the outside.

The manner of operation of the filling machine according to Figures 3 to 5 corresponds substantially to the manner of operation of the constructional form diagrammatically illustrated in Figures 1 and 2.

As will be seen, the rotor body 17 is adapted to be withdrawn from the machine in order to facilitate cleaning. For cleaning the machine, the lid 19 is lifted, whereby the guide pins 42 on the blades or vanes 40 are disengaged from their guide slot 44 in the cover, and the lid is swung out into the position illustrated in Figure 3. The shaft 25 and consequently the rotor body 17 are thereafter lifted by depression of the pedal 28.

The rotor body is then completely free. The vanes 40 may either be extracted before the rotor body is lifted, or subsequently removed from the base 46 of the upper housing portion 16, the pins 42 being removed from slots 48 in the base 46. The filling arrangement of the machine can then be satisfactorily cleaned without difficulty. Any washing liquid running down flows over the overflow discs 37 and into the discharge trough 38. The outlet extension 41 serving for filling the container, however, also serves to discharge the main quantity of the washing liquid.

It will be obvious that the raising and lowering of the shaft 25 can be carried out in various ways. Instead of the foot lever, a hand lever may be provided. Actuation is also possible by means of a hand wheel through a pinion and a toothed rack.

I claim:

1. A machine for introducing foodstuffs into containers comprising: a housing provided with an inlet for food material, the housing having an outlet spaced from the inlet, a rotor mounted within the housing and eccentric with respect thereto, a plurality of substantially radial vanes in the rotor, means associated with said vanes for causing the vanes to reciprocate cyclically as the rotor turns and to cause the vanes to move outwardly as they approach the inlet and to deliver the material to the outlet, means defining a suction chamber above the housing and opening downwardly into the interior of the housing at said region where the vanes moves outwardly before reaching the inlet, a suction pipe connected to said suction chamber, and an evacuating device connected to the other end of said suction pipe for withdrawing air from said region.

2. A machine according to claim 1, wherein the suction chamber comprises a cylindrical body and a raisable lid into which opens the suction pipe.

3. A machine according to claim 1 comprising a vertical shaft supporting said rotor.

References Cited in the file of this patent

UNITED STATES PATENTS

| | | |
|---|---|---|
| 475,367 | Wassermann | May 24, 1892 |
| 2,451,279 | De Lancey | Oct. 12, 1948 |
| 2,690,589 | Moses | Oct. 5, 1954 |
| 2,742,188 | Bills et al. | Apr. 17, 1956 |
| 2,763,336 | Erikson | Sept. 18, 1956 |

FOREIGN PATENTS

| | | |
|---|---|---|
| 1,086,713 | France | Aug. 11, 1954 |